United States Patent
Divo et al.

(10) Patent No.: US 7,530,690 B2
(45) Date of Patent: May 12, 2009

(54) CENTERING AND BLOCKING DEVICE FOR AN OPHTHALMIC SPECTACLES LENS, AN AUTOMATIC DETECTION METHOD, AND ASSOCIATED MANUAL CENTERING METHODS

(75) Inventors: Fabien Divo, Charenton (FR); Stephane Boutinon, Charenton (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 306 days.

(21) Appl. No.: 10/587,348

(22) PCT Filed: Oct. 19, 2004

(86) PCT No.: PCT/FR2004/002668

§ 371 (c)(1),
(2), (4) Date: Jul. 26, 2006

(87) PCT Pub. No.: WO2005/093495

PCT Pub. Date: Oct. 6, 2005

(65) Prior Publication Data

US 2007/0146687 A1    Jun. 28, 2007

(30) Foreign Application Priority Data

Feb. 24, 2004   (FR)   ..................................  04 01857

(51) Int. Cl.
G02C 7/02 (2006.01)

(52) U.S. Cl. .................. 351/177; 351/159; 351/178; 451/42

(58) Field of Classification Search ............. 351/177
See application file for complete search history.

(56) References Cited

U.S. PATENT DOCUMENTS

| 1,873,249 | A |   | 8/1932 | Allen |
|---|---|---|---|---|
| 3,586,448 | A |   | 6/1971 | Beasse |
| 4,019,285 | A | * | 4/1977 | Gravell ....................... 451/390 |
| 4,330,203 | A |   | 5/1982 | Oppenheim et al. |
| 4,737,918 | A |   | 4/1988 | Paimpol |
| 5,428,448 | A | * | 6/1995 | Albert-Garcia ............. 356/612 |
| 5,505,654 | A |   | 4/1996 | Wood et al. |
| 5,523,836 | A |   | 6/1996 | Minix et al. |
| 5,867,259 | A | * | 2/1999 | Yanagi et al. ............... 356/124 |

(Continued)

FOREIGN PATENT DOCUMENTS

EP    0 409 760    1/1991

(Continued)

Primary Examiner—Jessica T Stultz
(74) Attorney, Agent, or Firm—Young & Thompson

(57) ABSTRACT

The device includes receiver elements (121, 114) for receiving the ophthalmic lens; on either side of the receiver elements, firstly lighting elements (S) for illuminating the ophthalmic lens (103) installed on the receiver elements, and secondly acquisition elements (122, 125, C) for acquiring the shadow of the ophthalmic lens illuminated by the lighting elements (S); measurement elements (S, 124, C) suitable for measuring the optical deflection power exerted by the ophthalmic lens on at least one light ray and for delivering a signal representative of the deflection power; and an electronic and computer system including geometrical correction calculation instructions for deducing from the measured deflection power a corrected shape for at least a portion of the shadow of the ophthalmic lens as perceived by the acquisition elements (122, 125, C)

42 Claims, 4 Drawing Sheets

U.S. PATENT DOCUMENTS

| | | | |
|---|---|---|---|
| 6,056,633 A | 5/2000 | Rubio | |
| 7,191,030 B2 * | 3/2007 | Videcoq | 700/164 |
| 2001/0055111 A1 * | 12/2001 | Yoda et al. | 356/127 |
| 2002/0021437 A1 | 2/2002 | Volkenandt et al. | |
| 2003/0112426 A1 * | 6/2003 | Devie et al. | 356/124 |

FOREIGN PATENT DOCUMENTS

| | | |
|---|---|---|
| EP | 1 167 942 | 1/2002 |
| WO | WO 01/25744 | 4/2001 |
| WO | WO 02/098606 | 12/2002 |

* cited by examiner

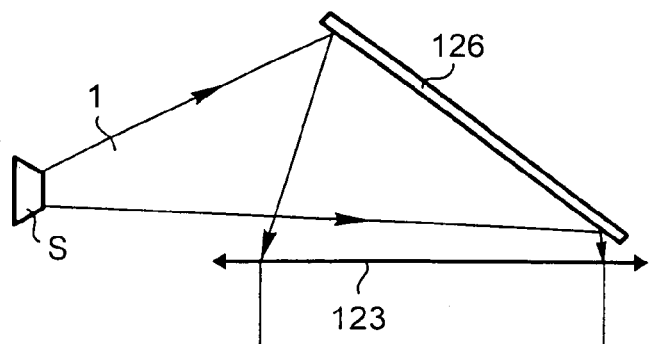
Fig.2
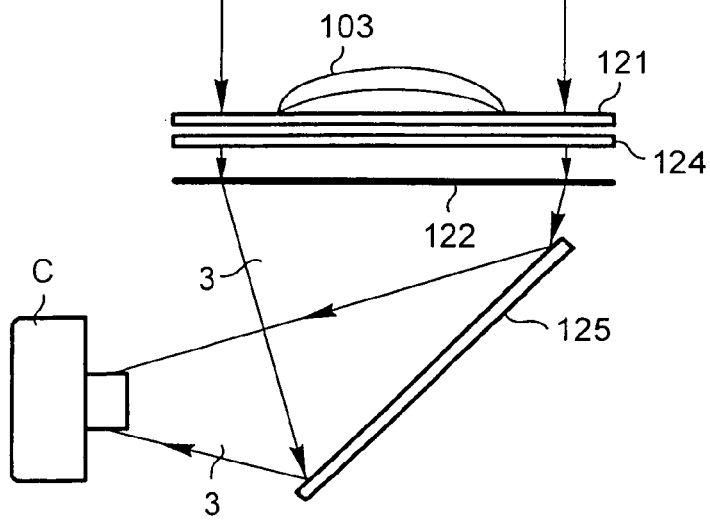
Fig.3
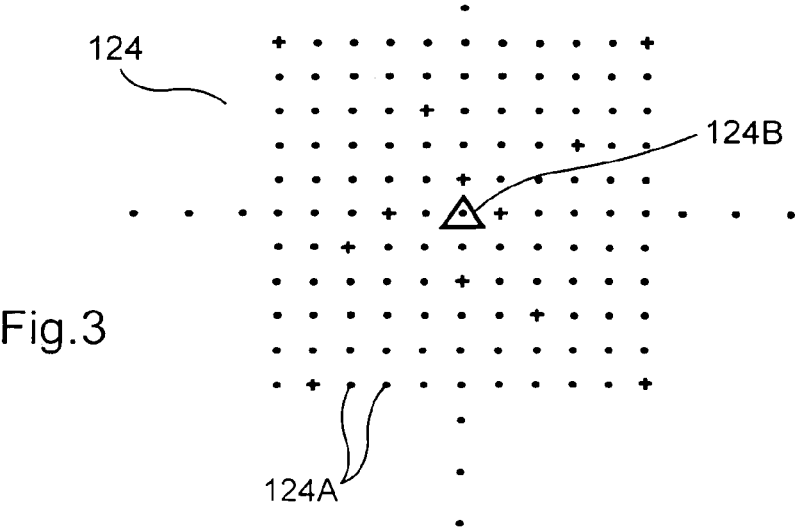

Fig.5B
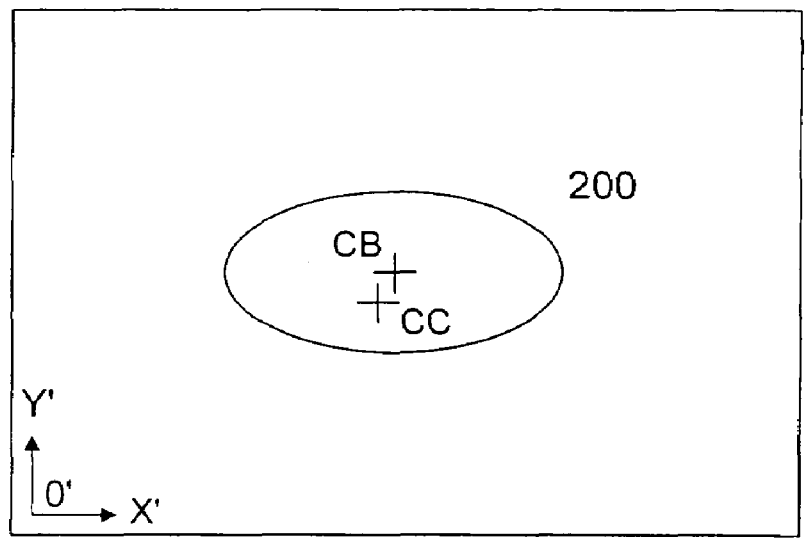
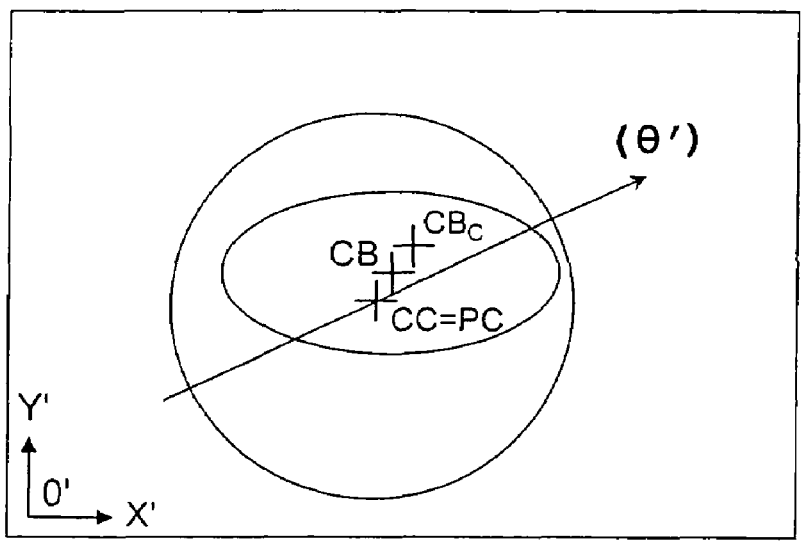
Fig.5C

CENTERING AND BLOCKING DEVICE FOR AN OPHTHALMIC SPECTACLES LENS, AN AUTOMATIC DETECTION METHOD, AND ASSOCIATED MANUAL CENTERING METHODS

BACKGROUND OF THE INVENTION

1. Field of the Invention

The present invention relates in general to mounting ophthalmic lens in a frame.

More particularly, the invention relates to a centering device adapted to detect automatically the position of one or more marks on an ophthalmic lens, and in particular the position of the mark(s) serving to identify a center and/or axis marking of an ophthalmic lens to be identified.

The invention also relates to methods of automatically detecting the positions of such marks and in particular a center and/or axis marking for an ophthalmic lens, and to two methods of manually centering an ophthalmic lens using such a centering and blocking device.

2. Description of the Related Art

Centering and blocking devices are appliances in widespread use in the field of optics. They are used in the process of fabricating a pair of spectacles, immediately prior to machining the ophthalmic lenses in order to fit them to the shape of the spectacles frame that has been selected.

Usually, a "raw" ophthalmic lens is substantially circular in shape, being of diameter that is sufficient to enable it to be mounted properly in the rim of the selected frame.

A centering and blocking device is then used to fix a handling peg on the ophthalmic lens in question, known as a "block".

In a subsequent fabrication step, the handling peg is used for rotating the ophthalmic lens in order to machine it.

The handling peg is put into place on the front face of the ophthalmic lens at a point that is determined by calculation as a function in particular of the position of the "optical center" (in the broad sense of the term) or more generally the center point of the lens, the shape of the selected frame, and certain characteristics of the wearer, in particular the pupillary distance or half-distance and the height of the frame (the height of the pupils relative to the bottom portions of the rims of the frame).

Proper positioning or centering of the lens in the frame involves several components:

It is necessary to position the lens center point that faces the pupil of the eye (optical center for a single-vision lens, front-central point, center marking for a marked progressive lens, point determined from microetching of any progressive lens, or determined from the segment or marked point for a bi- or trifocal lens). Given the right (or left) shape of the lens, as read previously from a reader, and given the value of the half-spacings and the heights of the right (and left) eyes, it is possible to determine where the pupil of the right (or left) eye is to be found in this lens shape. Any offset between the center point of the lens and the pupil of the eye leads to prismatic effects that are undesirable for the wearer, and that are thus inconvenient. These effects are particularly troublesome when the lens is a high-power lens.

It is necessary to orient the axis of the lens in compliance with the prescription or the typology of the lens. For a cylindrical single-vision lens, the axis of the cylinder on the mounted lens must correspond with the prescribed axis. Any offset between the axes leads at least to poor correction (residual astigmatism) and that defect can be particularly troublesome when the cylinder is strong. With a progressive lens, the axis of the lens (as marked or as defined by microetching) must be horizontal in order to ensure that a lens of that type is properly mounted. For a bi- or trifocal lens, the segment must be horizontal not only for physiological reasons (good or bad correction), but also for reasons of appearance.

It is necessary to verify that the lens is large enough to occupy the frame.

It is necessary to verify that near correction (for a bi- or trifocal lens or for a progressive lens) is properly located in the frame. This can readily be understood from a physiological point of view (the wearer must be able to "access" the near vision zone of the lens in order to be properly corrected). In addition, for bi- or trifocal lenses, the segment must not be truncated, for reasons of appearance as well.

It is necessary to verify that far vision is well located in the frame, for the same physiological reasons. Complying with these various positioning components requires accurate measurement and viewing of the position of the center point, of the axis of the lens, of the outline of the lens, and of the positions of the reference points for near vision and for far vision (with a progressive lens).

A center and/or clamping device is generally adapted to determine the position of an optical center for a single-vision lens, the position of one of the optical centers or any remarkable point known as a center point for a bifocal or trifocal lens, and is also adapted to determine some of the reference marks that the manufacturer usually causes to appear on the surface of progressive lenses. When the centering device is also a clamping device in the sense that it possesses means for manually or automatically placing a centering peg on the lens marking the detected reference point of the lens, the device is also adapted to determine by calculation a point on the surface of the lens that defines the location where the handling peg is to be placed.

Whether in automatic mode or in manual mode, most presently-known centering and blocking devices detect the position of the optical center or of the center markings and/or the axis markings of an ophthalmic lens by illuminating said lens with a light beam (generally a collimated beam) and by using a translucent projection screen to sense the light beam that has passed through the lens. A camera placed behind the screen acquires the projected image, and then displays it on a display peripheral such as a cathode ray tube (CRT) screen or a liquid crystal display (LCD) screen. The image of the lens as generated in this way is superposed on the shape of the frame so that the operator can achieve centering in all of its components, automatically or manually. In automatic mode, electronic processor means identify the shadows of center and/or axis markings in order to define a frame of reference for the frame and mark said frame of reference or deposit on the frame a reference or centering peg or block in the desired configuration for identifying a reference from for the lens on the basis of which the lens will be cut out to have the desired outline.

Such devices lead to errors in detecting the real positions of marks on the lens, and in particular the position of the optical center or of the center and/or axis markings of the ophthalmic lens (typically the mounting cross, the marking points obtained by centering on a frontofocometer, the horizontal lines, the microengraving, the outline of the segment of a non-progressive bifocal lens). The same applies to the circles, known as fronto-measurement circles, locating reference points for near vision and far vision. This error results from prismatic deflections of the shadows of the markings induced by the lens itself which deflections depend on the spherical, cylindrical, and prismatic optical powers of the ophthalmic lens in the zone of the marking in question. Because of these deflections, on going through the lens, the projected images of the markings on the convex front face of the lens are deformed, thereby inducing error in the various centering components and running the risk of subsequent mounting being incorrect or even impossible.

For example, a lens with positive power generates on the projection screen an image of the marks on the lens that is contracted overall. Conversely, a lens with negative power generates an image that is magnified. If the ophthalmic lens for centering presents lateral prismatic power in the region of the marking in question, the shadow of the marking on the image will appear to be offset laterally relative to the real position of the marking on the front face of said lens in the direction and by an amount that correspond to the angle of the prism. Similarly, if the ophthalmic lens presents toroidal power, then centering and blocking devices can commit an error in detecting the axis marking if the axis formed by the markings and the main axis of the corresponding torus are not parallel or mutually perpendicular.

In contrast, the outline of the lens is never deformed since it is not subjected to any prismatic effect. As a result there is a relative offset in the projection of said outline compared with the offset projections of the marks on the lens.

These errors are particularly important when the prismatic effects are strong and the projection screen is far away from the lens.

In an attempt to remedy that problem of error in detecting marks on a lens, proposals have already been made to minimize the offset errors that are produced by moving the projection screen closer to the lens. However under such circumstances such closeness can degrade the intrinsic position of the device and the compromises that have been envisaged remain unsatisfactory.

Another solution has been put forward in document EP 0 409 760 which relates to a centering and blocking device in which, firstly the optical path of the light beam used for detecting a position of the optical center or of the center markings of the lens is reversed, i.e. the ophthalmic lens is illuminated from behind (given that the center markings and/or axis markings are provided on the front face of the lens), and the light beam transmitted through the lens is picked up from beside its front face, and secondly the translucent projection screen for picking up the transmitted light flux in front of the acquisition means is disposed as close as possible to the front face of the lens for centering so as to limit the lengths of the paths followed by light beams that have been deflected prior to being focused onto the acquisition means.

Nevertheless, that requires the translucent projection screen to be movably mounted on the structure of the device in order to be retracted so as to allow the handling peg to be placed on the determined location of the front face of the ophthalmic lens. Such complex mounting of the projection screen on the structure of the device increases the size of the device, the cost of manufacturing it, and above all does not enable measurements to be obtained with long-lasting precision.

SUMMARY OF THE INVENTION

In order to remedy the above drawbacks of the prior art, the present invention proposes correcting the deformation errors in the projected images of the various marks on a lens so as to enable the geometrical configuration of the marking on the lens to be verified accurately either automatically or manually. More specifically, the invention also proposes making use of such correction in automatic manner or in assisted manual manner to center and/or verify accurately the positioning of the lens overall, or of some specific point of the lens, within the outline of the frame in which it is to be mounted.

To this end, the invention provides a device for corrected acquisition of the shadow of an ophthalmic lens possessing one or more marks, the device comprising:

receiver means for receiving said ophthalmic lens;

on either side of said receiver means, firstly lighting means for illuminating the ophthalmic lens installed on said receiver means, and secondly acquisition means for acquiring the shadow of said ophthalmic lens illuminated by the lighting means;

measurement means suitable for measuring the optical deflection power exerted by the ophthalmic lens on at least one light ray and for delivering a signal representative of said deflection power; and an electronic and computer system including geometrical correction calculation instructions for deducing from said measured deflection power a corrected shape for at least a portion of the shadow of the ophthalmic lens as perceived by the acquisition means.

Other characteristics of the device in accordance with the invention that are advantageous and non-limiting are the following:

said corrected shape corresponds substantially to the shape that the shadow of said lens would present if said lens did not possess any deflection power;

the measurement means are suitable for measuring the deflection power exerted by the ophthalmic lens on at least three light rays passing through the lens at three points that are not in alignment;

the measurement means are of the type proceeding by deflectometry;

the deflectometry measurement means include at least one beam separator located between the lens receiver means and the acquisition means, which makes it possible to take accurate deflectometer measurements in order to measure with good accuracy the optical centers and the astigmatism axes of single-vision lenses, and also the vertex powers of lenses of any type;

the deflectometry measurement means include said acquisition means;

the acquisition means include a projection screen and an image acquisition system arranged to sense the image on said projection screen;

said receiver means, said lighting means, said acquisition means, and said measurement means are held stationary relative to one another;

the device has a single light path between said lighting means and said acquisition means;

said beam separator is a support for at least one sign located between said receiver means and said acquisition means, and the geometrical correction relationship calculated by said electronic and computer system is a function of the deformed shadow of the sign perceived by the acquisition means;

the sign support is activatable and deactivatable;

said sign support is a transparent active screen suitable for selectively displaying said opaque sign;

said transparent screen is a liquid crystal screen;

said sign support has a regular array of repeated patterns;

said sign support comprises a Hartmann matrix;

said sign support includes a geometrical figure having a maximum outside dimension lying in the range 2 millimeters (mm) to 10 mm;

the geometrical covers an area lying in the range 3 square millimeters (mm$^2$) to 80 mm$^2$;

the geometrical figure is of a shape different from a point or a cross, being suitable for being distinguished visually from a marking made on an ophthalmic lens;

the geometrical figure is a polygon, preferably a triangle;

the geometrical figure is a circle or an oval;

the measurement means are of the type operating by interferometry;

the device includes means for placing a handling peg at a location that is determined by calculation on the front face of said ophthalmic lens;

said means for placing the handling peg are automatic means;

said means for placing the handling peg are manually controlled manipulator means;

the device includes display means controlled by the electronic and computer system to display the at least partially corrected shape of the shadow perceived by the acquisition means;

the electronic and computer system controls the display means for displaying the outline of the lens without applying the geometrical correction calculation thereof;

the electronic and computer system includes image recognition instructions suitable for recognizing the shadow of a mark of the ophthalmic lens as perceived by the acquisition means and for applying said geometrical correction calculation thereto so as to deduce therefrom its corrected position in a known frame of reference corresponding substantially to the position that the shadow of said mark would present in said frame of reference in the absence of the lens possessing any deflection power;

the image recognition instructions are suitable for recognizing the shadow of a center and/or axis mark of the ophthalmic lens as perceived by the acquisition means; and the image recognition instructions are suitable for recognizing the shadow of a reference mark for far vision or for near vision on the ophthalmic lens as perceived by the acquisition means.

The invention also provides a method of correcting acquisition of the shadow of an ophthalmic lens presenting one or more marks, the method comprising the following steps:

illuminating the lens by a light beam;

measuring the optical deflection power exerted by the ophthalmic lens on at least one incident light ray of said beam; and from the measured deflection power, deducing by calculation a corrected shape for at least a portion of the shadow of said ophthalmic lens as illuminated by said light beam.

Other characteristics of the method in accordance with the invention that are advantageous and non-limiting are as follows:

said corrected shape corresponds substantially to the shape that the shadow of said lens would present if said lens did not possess any deflection power;

a measurement is made of the deflection power exerted by the ophthalmic lens on at least three distinct light rays passing through the lens at three points that are not in alignment;

in order to measure the deflection power of the ophthalmic lens, use is made of deflectometer means;

in order to measure the deflection power of the ophthalmic lens, the ophthalmic lens is illuminated and the shadow of the lens is sensed on acquisition means, a beam separator being disposed between said acquisition means and the lens;

in order to measure the deflection power of the ophthalmic lens, use is made of interferometer means;

for an ophthalmic lens of the multifocal type, the geometrical correction is applied to at least one reference mark for near vision or for far vision of the multifocal ophthalmic lens in order to obtain a corrected position for said mark;

the geometrical correction is applied to the shadow of at least one center and/or axis mark of the ophthalmic lens in order to obtain a corrected position for said shadow;

a virtual image representative of the outline desired after the lens has been cut to shape is displayed on a display screen, and the position of said outline image is identified relative to the corrected position for the shadow of the center mark on the lens;

the method includes a step of displaying the corrected shape of the shadow on the lens on a display screen;

during said display step, the shadow of the outline of the lens is displayed on a display screen without applying the geometrical correction calculation thereto;

the method includes a step of recognizing the shadow of a mark on the ophthalmic lens and a step of applying the geometrical correction calculation to said shadow of a mark so as to deduce therefrom its corrected position in a known frame of reference, said corrected position corresponding substantially to the position that the shadow of said mark would present in said frame of reference in the absence of the lens having any deflection power; and the method is applied to automatically centering the lens, and under such circumstances the shadow that is recognized is the shadow of a center mark and/or an axis mark of the ophthalmic lens.

BRIEF DESCRIPTION OF THE DRAWINGS FIGURES

The description below with reference to the accompanying drawings, given as non-limiting examples, shows clearly what the invention consists in and how it can be implemented.

In the accompanying drawings:

FIG. 2 is an optical diagram of the FIG. 1 device;

FIG. 3 is a diagrammatic plan view of the patterns of the transparent sign support of the FIG. 1 device;

FIG. 5B is a diagram showing the frame of reference of the display; and

FIG. 5C is a diagram in which the frames of reference of FIGS. 5A and 5B are superposed.

DETAILED DESCRIPTION OF THE PREFERRED EMBODIMENTS

Figure 1:
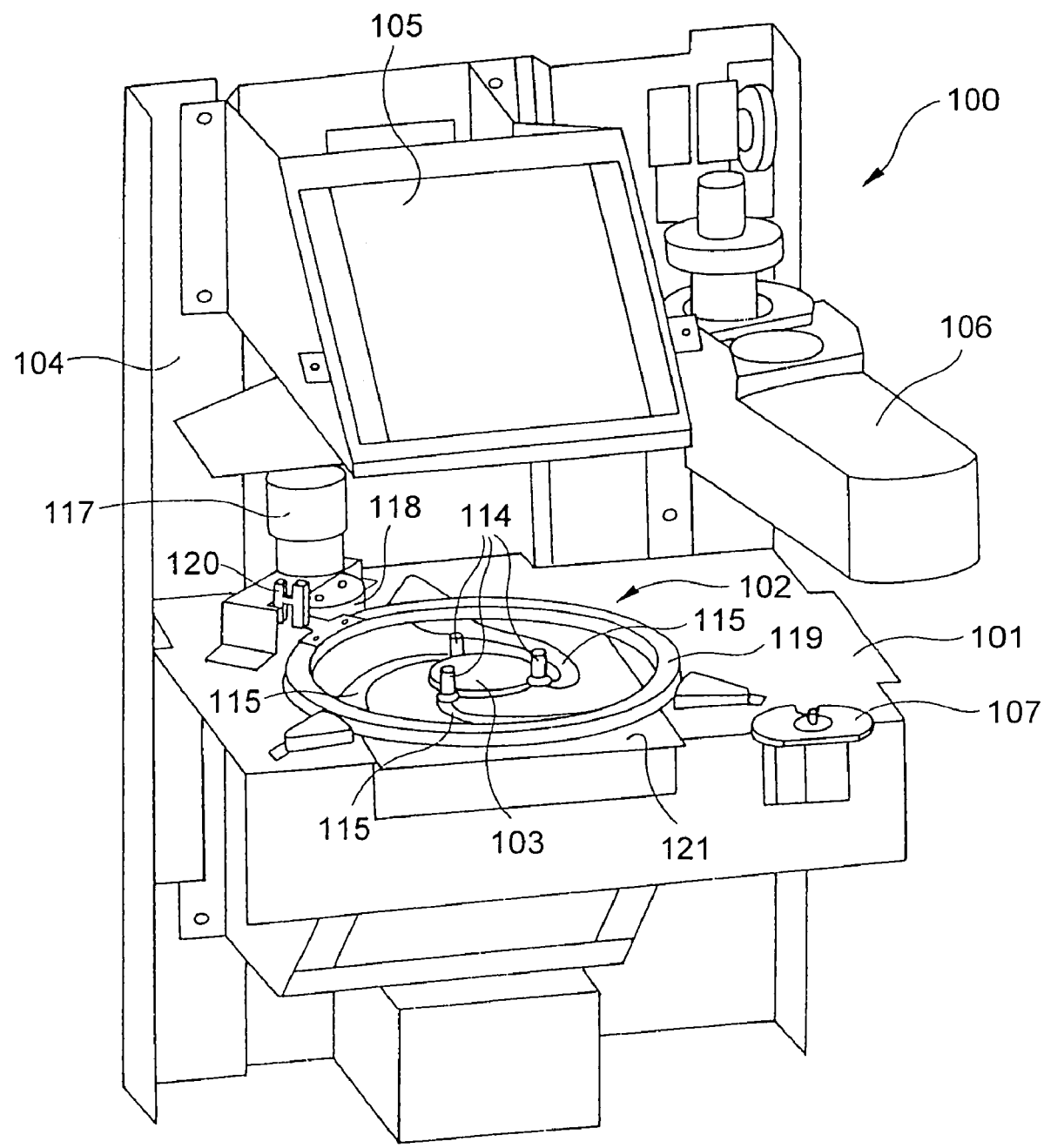
FIG. 1 is an overall perspective view of a center and/or blocking device of the invention.

FIG. 1 is a diagram showing an embodiment of a centering and blocking device 100 of the invention.

The device comprises a workbench 101 having placed thereon a centering mechanism 102 for centering an ophthalmic lens 103. The lens may be single-vision, bifocal, trifocal, or an ophthalmic lens that has progressive addition of power.

The centering and blocking device 100 further comprises a display screen 105 secured to the structure 104 in such a manner as to be visible to a user working at the workbench 101.

The centering mechanism 102 of the workbench 101 has a set of three jaws 114 for concentric clamping, each jaw being carried on an arm 115 that pivots about an axis (not visible in FIG. 1) that is stationary relative to the workbench 101. The arms are arranged in such a manner that on pivoting simultaneously about their respective axes they enable the three jaws 114 to move towards one another.

The clamping of the jaws 114 is controlled by a motor 117 having a shaft secured to a gearwheel 118 meshing with a ring 119 adapted to cause the arms 114 to pivot about their axes. Each of the arms 115 has a semicircular toothed portion (not shown) meshing with the outer periphery of the ring 119. When the gearwheel 118 turns under drive for the motor 117, it causes the ring 119 to rotate, thereby causing the jaws 114 to clamp or unclamp depending on the direction in which the ring 119 is being driven. An optical or an electromagnetic cell 120 serves to inform the motor 117 about the position of the ring 119.

The assembly formed by the arms 115 carrying the jaws 114, and by the ring 119 is placed over a transparent support plate 121.

Furthermore, as shown in FIG. 1, the centering and blocking device has a positioning arm 106, preferably an automatic arm, connected to the structure 104 and adapted to use a clamp to take hold of a handling peg placed on a receptacle 107 and deposited at a location that is determined by calculation on the front face of said ophthalmic lens 103.

For this purpose, the centering and blocking device 100 is adapted to detect and display the precise configuration of a center and/or axis marking of the ophthalmic lens 103. More generally, the device is capable of detecting and displaying the precise configuration of any mark on the lens 103, such as reference circles for near vision and far vision. Conventionally, the marks on a lens are applied to its convex front face which, in operation, is remote from the support plate 121.

For this purpose, and as shown diagrammatically in FIG. 2, the device advantageously comprises:

receiver means for receiving the ophthalmic lens 103;
on either side of said receiver means, firstly means for illuminating the ophthalmic lens 103 installed on said receiver means, and secondly means for acquiring the shadow, or which comes to the same but in the negative, the light transmitted through said ophthalmic lens 103;
measurement means S, 122, 124, C suitable for measuring the optical deflection power exerted by the ophthalmic lens 103 on at least one light ray and for delivering a signal representative of said deflection power; and
an electronic and computer system (not shown in the figures), such as a microcomputer or an application specific integrated circuit (ASIC) having instructions for calculating geometrical corrections so as to deduce from said measured deflection power a corrected shape for at least a portion of the shadow of the ophthalmic lens 103 as perceived by the acquisition means 122, 125, C.

In this example the receiver means is constituted by a support plate 121 that is transparent to light.

In the example shown, the illumination means comprise a light source S that emits a diverging light beam 1 towards a reflector system comprising a mirror 126 inclined at 145° and a converging lens 123 adapted to form a beam 2 of parallel light rays towards the ophthalmic lens 103 placed on the support plate 121 with its front face carrying the center and/or axis markings facing towards said converging lens 123.

In this example the acquisition means comprise a translucent plate 122 forming a projection screen and a digital camera C picking up the image on said screen from its side remote from the lens 103. The camera C delivers a signal to the electronic and computer system, which signal is representative of the image projected on the projection screen 122. The electronic and computer system includes image processor means (in the form of a computer program or an ASIC) suitable for processing the signal obtained at the output from the digital camera C. The image, as processed and corrected by the geometrical correction calculation means, is transmitted to the display means constituted in this example by the display screen 105. Said acquisition and analysis means comprise, between the transparent sign support 124 and the digital camera C, an optical reflector system for reflecting the light beams transmitted through the ophthalmic lens 103 and comprising a mirror 125 inclined at 45°. Via the optical angular deflection performed by the inclined mirror 125, the digital camera C picks up the images or shadows projected onto the translucent projection screen 122.

Advantageously, in the centering and blocking device 100, said receiver means, said lighting means, said acquisition and analysis means, and said transparent sign support are held stationary relative to one another.

In addition, as shown in FIG. 2, the device includes a single light path between said lighting means and said acquisition and analysis means, thus presenting the advantage of reducing the overall size and the manufacturing costs of the device, and above all of making it possible to obtain measurements with precision that is long-lasting.

In a preferred embodiment, the measurement means S, 124, C are suitable for measuring the deflection power exerted by the ophthalmic lens on at least three light rays passing through the lens via three points that are not in alignment. In order to increase precision and in particular in order to enable the device to obtain accurate power measurements without using additional means, the deflection measurement means are of the type that operates by deflectometry.

Specifically, these measurement means comprise the lighting means S and the acquisition means, together with the projection screen 122 and an image acquisition system C, 125 serving simultaneously to acquire the shadow of the lens 103. These image acquisition means are associated with means operating downstream from the lens to separate the light beam emitted from the source S into one or more light rays. This separation of the beam is performed by a single beam separator 124 in the form of a plate disposed between the lens receiver means 121, 114 and the projection screen 122 of the acquisition means. It is possible to envisage using a plurality of separation plates. Specifically, it comprises a transparent support 124 for an opaque sign 124A, 124B that is activatable and deactivatable and that is disposed between the support plate 121 and the projection screen 122 of the acquisition and analysis means.

According to an advantageous characteristic, the transparent sign support 124 is activatable and deactivatable.

In practice, this sign support can be implemented in the form of a transparent liquid crystal display (LCD) screen or the like, as in the example shown. It may also be constituted by a permanent passive support (such as a mark, grid, badge, or emblem, etc.) mounted to be movable relative to the ophthalmic lens, so as to be suitable for being retracted so as to disengage at least a portion of the shadow of the ophthalmic lens when said portion is to be examined without the sign, as explained below.

Under such conditions, the terms "activatable" and "deactivatable" mean that the support in question either does or does not perform its function of separating the light beam downstream from the lens over all or part of the surface area of the ophthalmic lens. Specifically, it will be understood that activating or deactivating the support can amount to different actions depending on the type of support that is used. When the support is of the passive type and consists, for example, in a support having one or more patterns marked thereon, such as a grid or a perforated plate, the term deactivatable means mechanically retractable, in full or in part, with the support then being mounted to move relative to the lens (regardless of whether it is the support that moves or the lens that moves while the support remains stationary) so as to enable at least a portion of the corresponding surface area of the shadow of the lens to be read directly using the complete light beam and without said beam being separated. When the support is of the active type, and for example consists in a dynamic display screen such as a CRT screen or an LCD screen, the term deactivatable means that the electronics controlling the screen turns off all of the separation patterns over at least a zone of said screen corresponding to the zone of the screen that is to be read without separating the beam from the lens.

Specifically, the sign support is an active transparent screen capable of displaying said opaque sign when suitably activated by an associated electronic driver unit. For example it may be a liquid crystal screen.

When it is not activated, the transparent sign support 124 is equivalent to the transparent support plate 121 and does not show any opaque sign.

When it is activated, the transparent sign support 124 displays the opaque sign(s) used for detecting the positions of the center and/or axis markings on the ophthalmic lens 103.

As shown more particularly in FIG. 3, said transparent sign support 124 comprises an array of opaque patterns 124A that are repeated in regular manner. In particular, it comprises a Hartmann matrix.

Furthermore, and also shown in FIG. 3, said transparent sign support 124 includes, preferably at its center, a geometrical FIG. 124B of maximum outside dimension lying in the range 2 mm to 10 mm. This geometrical FIG. 124B covers any area lying in the range 3 mm$^2$ to 80 mm$^2$. It is an outline figure, distinct from a point or a cross, so as to enable it to be distinguished from a marking on an ophthalmic lens. The geometrical FIG. 124B in this example is a polygon, preferably a triangle, however in variants that are not shown, said geometrical figure could be a circle or an oval.

In any event, it can be seen that this figure or array serves to separate the light beam into a plurality of light rays passing through the lens at a corresponding number of points that are not in alignment that are discretely or continuously distributed over the lens.

In a variant, it is possible to use measurement means relying on interferometry.

Advantageously, the centering and blocking device 100 as described above enables a method of automatically detecting the position of a mark present on one of the faces of the lens to be performed, the mark typically being present on the convex front face of the lens. In the example described, and in order to have a concrete idea, the purpose is to detect the position of a center and/or axis marking on the ophthalmic lens 103 in the corresponding rim of the frame in which the lens is to be mounted. This method comprises the following steps.

Step a

For calibration purposes, acquiring and storing the shadow of an opaque sign 124B formed on the transparent sign support 124 while activated and illuminated on its own by the lighting means S.

Step b

Superposing the ophthalmic lens 103 and the associated transparent sign support 124.

Step c

Inserting an opaque pattern of known shape by activating the support 124 between the lens and the translucent screen. The shadow of the sign of said support as illuminated by the lighting means S is then acquired and stored in a random access memory (RAM) of the processor means.

Step d

Acquiring shadow of the center and/or axis marking of the ophthalmic lens 103 as illuminated by the lighting means S and storing it in the RAM of the processor means, the transparent support then being deactivated so as to present no opaque sign.

Step e

From the prismatic deflection of the geometrical FIG. 124B as measured by comparing the acquisitions taken in steps a) and c), deducing the non-deflected corrected position for the shadow of the mark on the front face of said ophthalmic lens.

The deformation of said pattern is determined while the lens is present.

The deformation of the pattern by the prismatic effect of the lens then makes it possible to determine the deformation of the shadow of the lens at the location of the pattern.

For example, if the distance between the projection screen and the pattern is d1, and the distance between the lens and the projection screen is constant or approximately known and equal to d2, with deformation of the pattern being equal to def1, then the deformation of the image of the lens in this location is given by:

$$def2 \approx def1 * d2/d1$$

Thereafter, the corrected position or shape for the mark is calculated which, according to the invention, corresponds substantially to the position that the shadow of the mark on the lens would have if the lens did not have any deflecting power.

This calculation can be implemented in several ways.

1st Method: Local Method

From the local measurement of the deformation of the geometrical figure, modeling the overall deformation of the lens using a mathematical model of parameters that can be determined using this local measurement. The parameters are thus calculated with the local measurement and these parameters are applied to the global model.

For example, it is possible to consider that the global deformation of the lens can be modeled simply by means of the following parameters:

$$DX = aX + bY + c \text{ and } DY = dX + eY + f$$

where:
X and Y are the coordinates of a point on the lens;
DX = deformation along the X axis;
DY = deformation along the Y axis; and
a, b, c, d, e, and f are parameters that need to be determined.

These can be calculated, for example by measuring the local deformation of a pattern constituted by at least three points A1, A2, and A3.

There is then a system of six equations in six unknowns (a, b, c, d, e, f) that need to be solved:

$$DX(A1)=aXA1+bYA1+c$$

$$DY(A1)=dXA1+eYA1+f$$

$$DX(A1)=aXA2+bYA2+c$$

$$DY(A1)=dXA2+eYA2+f$$

$$DX(A1)=aXA3+bYA3+c$$

$$DY(A1)=dXA3+eYA3+f$$

Naturally, it is possible to measure more than three points (N points) and to solve a system in 2N equations and six unknowns, e.g. by a least squares method, thereby enabling a, b, c, d, e, and f to be determined with better accuracy.

2nd Method: Global Method

The deformation of the shadow is measured over the entire lens.

For example, it is possible to envisage using a pattern constituted by numerous points distributed over the entire lens. It is then possible, for example, for each of these points, to calculate the deformation of the shadow and to perform linear interpolation of the deformation between pairs of these points.

Step f: Displaying the Complete Corrected Image of the Lens

In order to display the deformation-corrected image (or shadow) of the lens, for each pixel of the corrected image, the corresponding pixel of the non-corrected image is calculated using the estimated deformation of the lens as calculated previously for the corresponding point, and the value of the non-corrected pixel is given to the pixel in the corrected image.

For each pixel (i,j) in the (corrected) image, there is a corresponding point Aij of the lens.

The point Aij is shifted by def2$ij$, where def2$ij$ is estimated from one of the two above methods (local/global). The offset point corresponds to Bi'j' in the non-corrected image.

The intensity of the non-corrected image at point Bi'j' is then given to point Aij.

In contrast, the shadow of the outline of the lens is displayed as is, i.e. without correction.

To do this, if the entire shadow of the lens is corrected, then software recognition of the outline of the lens is used so as to exclude from the shadow from the correction on display: the corresponding pixels are not redefined.

If the image correction is applied to only a portion of the lens situated within its outline, then there is no need to perform such recognition. The shadow of the outline is displayed directly, with the entire zone situated outside the corrected zone, and without any overall correction.

The electronic and computer system performs this alternative and controls the display screen 105 so as to display the outline of the lens 103 without applying the geometrical correction calculation thereto.

Step g: Determining the Corrected Positions for the Marks in a Frame of Reference of the Device (Automatic Mode)

This step is not essential. It can be omitted if the appliance is used manually.

The electronic and computer system includes image recognition instructions suitable for recognizing the shadow of a mark on the ophthalmic lens 103 as perceived by the acquisition means 122, 125, C and to apply said geometrical correction calculation thereto in order to deduce its corrected position in a known frame of reference corresponding substantially to the position that said mark would occupy in said frame of reference in the absence of the lens 103 having any deflection power.

In particular, the image recognition instructions are suitable for recognizing the shadow of one or more center and/or axis marks, such as the center cross and the axis lines, of the ophthalmic lens perceived by the acquisition means 122, 125, C.

Furthermore, when processing a multifocal lens, the image recognition instructions are suitable for recognizing the shadow of a reference mark for far vision or for near vision belonging to the ophthalmic lens and perceived by the acquisition means 122, 125, C.

In order to determine the geometrical corrections for application to the marks on the lens, it is possible for example to proceed as follows. Starting from the local corrected image (shadow) of the lens, performing automatic recognition of the marks on the lens. Image processing is thus used to recognize the front points, the marks on progressive lenses (center cross, near/far vision circle, axis), the segments, and the microengraving.

These automatically recognized optical parameters are correct (corrected) since they are taken from a lens image that has been subjected to global correction.

Step h: Centering

This method of corrected detection of the position of the center and/or axis marking on the ophthalmic lens makes it possible to center the ophthalmic lens 103 using a given centering sight for depositing the handling peg at a determined location on the front face of the lens 103, thereby enabling the lens 103 to be blocked and subsequently rotated in a grinding machine so as to shape it to match the rim of the selected frame.

In order to center said ophthalmic lens 103 automatically or manually, prior to above-described steps a) to d), the operator uses a control pad to inform the centering and blocking device of the type of ophthalmic lens that is to be centered, the position of the center point PC of the lens 105 (see FIGS. 5A to 5C) relative to the boxing center CB which is the center of the selected frame (see definition below with reference to FIGS. 5B and 5C), and possibly also for cylindrical single-vision ophthalmic lenses, the orientation that is desired for the axis of the lens.

Figure 5A:
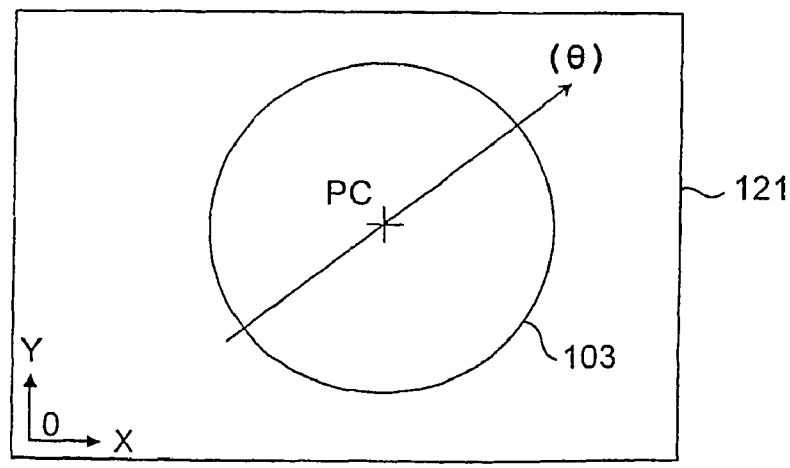
FIG. 5A is a diagram showing the frame of reference of the camera.

The above-mentioned parameters comply with a centering convention that includes firstly a measurement frame of reference (O, X, Y) associated with the camera and shown in FIG. 5A, and secondly a display frame of reference (O', X', Y') associated with the frame and shown in FIG. 5B.

The center point PC of the ophthalmic lens as identified by coordinates $X_{PC}$ and $Y_{PC}$ is acquired in the measurement frame of reference (O, X, Y).

Concretely, the nature of the center point depends on the type of lens in question.

For a single-vision lens, the center point PC is the previously-marked optical center.

For a bifocal lens, the center point PC is the center of the near vision segment.

For a lens with progressive power addition, the center point PC is the center cross.

Furthermore, as can be seen in FIG. 5A, the orientation of the ophthalmic lens is identified by an angle θ which is the angle between a particular axis of the lens and the axis X of the measurement frame of reference.

Depending on circumstances, this particular axis is:
the cylinder axis for a toroidal single-vision lens;
the axis of the horizontal markings for a progressive lens; or
the axis of the near vision segment for a bifocal lens.

The display frame of reference relates to the selected frame. This frame has two rims (of arbitrary and not-necessarily circular shape) each serving to receive one lens. Specifically, the rim shown presents a curved shape in the X, Y frame of reference. A center is defined for the frame rim. Conventionally, it is possible for example to define as the center of the frame rim, as the center of the rectangle in which the frame rim can be inscribed. This center is known as the "boxing" center and is referenced CB, being identified by its ordinates $X'_{CB}$, $Y'_{CB}$ in the (O', X', Y') frame of reference.

The handling peg is generally secured to the lens at its boxing center CB.

The difference that is desired in X and Y terms between the center point PC and the boxing center CB is input by the operator into the centering and blocking device 100. It depends on the prescription, on the morphology of the wearer, and on the shape of the frame.

This difference presents the following coordinates in the (O', X', Y') frame of reference:

$$\delta X' = X'_{PC} - X'_{CB}, \delta Y' = Y'_{PC} - Y'_{CB}$$

(see FIG. 5C).

In FIG. 5C, θ' denotes the angle desired for the axis of the ophthalmic lens in the display frame of reference (O', X', Y'), and thus in the frame of reference of the frame (see FIG. 5C).

After inputting the above-specified centering parameters into the centering and blocking device, the operator places the lens on its support and the centering operation can begin.

Two modes of operation are provided: an automatic mode and a semi-automatic or assisted manual mode.

In automatic mode, the operator begins by placing the ophthalmic lens 103 in an arbitrary position on the transparent support plate 121 (see FIG. 1) with its front face facing towards said lighting means. Once parameter input has been confirmed, the jaws 114 clamp onto the ophthalmic lens 103 and the centering operation can begin.

Steps a) to d) of the detection method are then performed on the ophthalmic lens 103.

Then, after step d), when the lens is a single-vision ophthalmic lens, the image obtained in step c) is subjected to rotation and/or translation so as to place the center point and the axis of the ophthalmic lens in the desired position in the display frame of reference prior to displaying the image as calculated in this way with the outline of the ophthalmic lens being encrusted together with the shape of the frame (see FIG. 5C).

When the ophthalmic lens has progressive power addition or is a bifocal lens, then after step d) of calculating the non-deflected corrected position of said centering mark on the front face of said ophthalmic lens, the image obtained in step c) is subjected to rotation and/or translation so as to place the center point and the axis of the ophthalmic lens in the desired position in the display frame of reference prior to displaying the image as calculated in this way with the encrusted outline of the ophthalmic lens and the shape of the frame (see FIG. 5C). The correction of the deflection of the light beams transmitted through the lens is transferred to the display by moving the image of the shape of the frame.

When the centering and blocking device 100 is operating in manual mode, the jaws 114 are clamped while empty so as to form a tripod on which the ophthalmic lens 103 for centering is positioned. The image of the ophthalmic lens 103 as observed by the digital camera C is displayed in real time on the display screen 105 of the centering and blocking device 100.

When the ophthalmic lens is a single-vision lens, its optical center and optionally its axis are initially marked by means of a frontofocometer.

Thereafter, the centering and blocking device 100 is used to perform the following steps.

Step a)
For calibration purposes, acquiring and storing the shadow of the predefined geometrical FIG. 124B formed on the transparent sign support 124 as illuminated on its own by the illumination means, with the geometrical figure, in this case a triangle, having a maximum outside dimension lying in the range 2 mm to 10 mm.

Step b)
Superposing the ophthalmic lens 103 and the transparent sign support 124.

Step c)
Acquiring and storing the shadow of said geometrical FIG. 124B of said support 124 as deflected by said ophthalmic lens 103 when both it and said support 124 are illuminated by said lighting means S.

Step d)
Using the acquisition means, i.e. the camera C, to acquire the shadow of the center and/or axis marking PC of the ophthalmic lens 103, while it is illuminated by the lighting means S, but not storing it.

Simultaneously, acquiring the shadow of the outline of the ophthalmic lens 103 for centering.

Step e)
Using display screen 105 to display simultaneously the shadow of the center and/or axis marking PC of the ophthalmic lens 103, and a virtual centering target CC corresponding to the position desired for the center mark PC of the lens 103 relative to the reference point CB for the rim 200 of the frame.

This shadow of the outline of the lens 103 and a virtual image 200 representative of the rim concerned of the frame are displayed simultaneously on the display screen 105. This virtual image of the rim of the frame 200 is offset laterally and/or angularly by calculation independently of the reference point CB of said rim of the frame, relative to the virtual centering target CC associated with the center of the frame 200 in order to compensate for the prismatic deflections induced by the lens 103 that is to be centered.

Step f)
From the prismatic deflection of the geometrical FIG. 124B as measured by comparing the acquisitions performed in steps a) and c), deducing a corrected relative position CBc for the reference point CB of the rim of the frame 200 relative to the center mark PC of the ophthalmic lens 103, or vice versa.

Step g)
Moving the lens manually so as to bring the shadow of the center mark PC of the lens 103 manually into coincidence with the virtual centering target CC.

Steps a) to g) are not necessarily performed in the same order as those steps are listed above, and could be varied as a function of the operating procedure used.

In a particularly advantageous implementation, steps c) to f) are performed in a loop following steps a) and b), so as to obtain continuously a corrected relative position CBc for the reference point CB of the frame rim 200.

The operator displaces the lens manually so as to cause the image obtained in step c) to perform movement in rotation and/or translation in such a manner as to place the center point and the axis of the ophthalmic lens in the desired position in the display frame of reference, prior to displaying the image as calculated in this way encrusted with the outline of the ophthalmic lens and the shape of the frame (see FIG. 5C). The correction of the deflection of the light beam as transmitted through the lens is applied in real time to the display by moving the image of the shape of the rim 200 of the frame accordingly.

In another implementation that is simpler to perform, steps d) and e) are performed in a loop after steps a) and b), while steps c) and f) are performed once again after step g). The correction for the deflection error on the center marking is then not forwarded in real time to the display screen, but is taken directly into account in the positioning information transmitted to the blocking arm for putting a handling peg into position.

Figure 4:
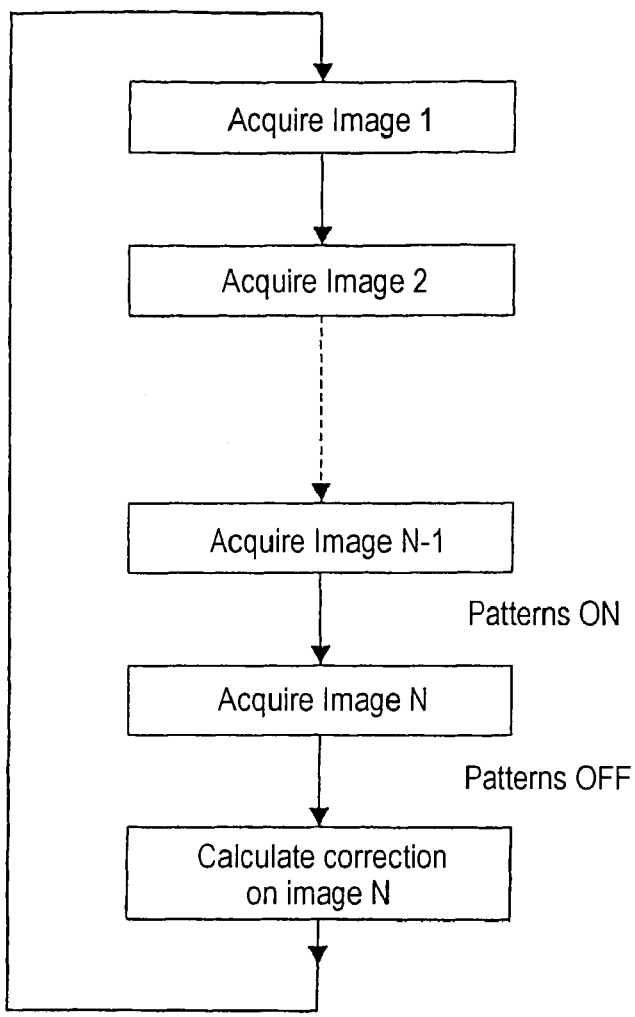
FIG. 4 shows an algorithm of a centering method of the invention with short-term display of the transparent sign support of the FIG. 1 device.

In a variant implementation of the above-described manual centering method, it is proposed to combine the advantages of correcting the prismatic deflection of the position of the marking of the lens with a comfortable display for the operator by displaying the patterns 124A, 124B of the transparent sign support 124 cyclically, synchronizing acquisition of the image of the lens 103 when said patterns 124A, 124B are activated, and calculating the correction of the prismatic deflection induced by the lens on said captured image in application of the cycle shown in FIG. 4.

More particularly, the method of manual centering the ophthalmic lens 103 using the centering and blocking device comprises the following steps.

Step a)

For calibration purposes, acquiring and storing the shadow of an opaque sign (e.g. the geometrical FIG. 124B) formed on the transparent sign support 124 interposed between the lighting means and the acquisition and analysis means C, while said support 124 is illuminated on its own by said lighting means.

Step b)

Superposing said ophthalmic lens 103 on the transparent sign support 124.

Step c)

Acquiring and storing the shadow of the opaque sign 124A, 124B of said support 124 as deflected by said ophthalmic lens 103 when both it and said support 124 are illuminated together by the lighting means S.

Step d)

Using the acquisition means C to acquire the shadow of the center and/or axis marking PC of the ophthalmic lens 103 while the lens is illuminated by said lighting means.

Simultaneously acquiring the shadow of the outline of the ophthalmic lens 103 for centering.

Step e)

Using a display screen 105 to display simultaneously, directly from the acquisition and analysis means, the shadows of the ophthalmic lens 103, of the center mark PC of the lens 103, and of the opaque sign 124B when it is activated, and also a virtual centering target CC corresponding to the desired position for the center mark PC of the lens 103 that is to be centered relative to a reference point CB of the rim 200 of the frame. The opaque sign 24B of the transparent sign support 124 is displayed intermittently for a display duration that is short enough for the human eye not to perceive its shadow on the display screen.

The display screen 105 is used to display both said shadow of the outline of the lens 103 and a virtual image 200 representative of the corresponding rim of the frame. This virtual image of the rim of the frame 200 is shifted independently of the reference point CB of said frame rim, relative to a virtual centering target CC associated with said frame rim, in order to compensate for the prismatic deflections induced by the lens 103 for centering.

Step f)

From the prismatic deflection of the geometrical FIG. 124B as measured by comparing the acquisitions performed in steps a) and c), deducing a corrected relative position CBc for the reference point CB of the frame rim 200 relative to the center mark PC, or vice versa.

Step g)

By manually displacing the ophthalmic lens 103, putting the center mark PC of the ophthalmic lens 103 into coincidence with the virtual centering target CC.

In this case likewise, steps a) to g) are not necessarily performed in the order in which those steps are described above, and on the contrary can vary as a function of the operating procedure used. The operator displaces the lens manually so as to cause the image obtained in step c) to move in rotation and/or in translation so as to place the center point and the axis of the ophthalmic lens in the desired position in the display frame of reference before displaying the image as calculated in this way with the encrusted outline of the ophthalmic lens and the shape of the frame (see FIG. 5C). The correction for the deflection of the light beam transmitted through the lens is forwarded in real time to the display by moving the image of the shape of the frame accordingly.

In a particularly advantageous implementation, steps c) to f) are performed in a loop after steps a) and b), so as to obtain continuously a corrected relative position CBc for the reference point CB of the rim of the frame 200.

In another implementation, that is simpler to implement, steps d) and e) are performed in a loop after steps a) and b) while steps c) and f) are performed once only after step g). The correction for the deflection error of the center mark is then not forwarded to the display screen but is merely taken into account in the positioning information transmitted to the blocking arm in order to deposit a handling peg.

Thus, advantageously, using this method of the invention, the display of the shadow of the opaque sign of the transparent support that is used for determining the prismatic deflection of the position of the lens mark and for correcting the resulting detection error is eliminated from the display on the display screen. This avoids disturbing reading of the display screen by the operator who then sees on the screen only the image of the lens and the image of the sights, while taking account of the determined correction for prismatic deflection.

This centering method contributes to blocking the ophthalmic lens 103. It is thus after said lens has been centered by the above-described method that the automatic positioning arm 106 is used to deposit a handling peg at a predetermined location on the ophthalmic lens 103.

For this purpose, the electronic processor unit calculates the corrected location where the handling peg is to be deposited, taking account of the corrected position CBc of the reference point CB for the rim of the frame 200 as calculated in step f).

The present invention is not limited in any way to the implementations described and shown, and the person skilled in the art will know how to make any variant in the spirit of the invention.

The invention claimed is:

1. A device for corrected acquisition of the shadow of an ophthalmic lens (103) possessing one or more marks (PC), the device comprising:

receiver means (121, 114) for receiving said ophthalmic lens;

on either side of said receiver means, firstly lighting means (S) for illuminating the ophthalmic lens (103) installed on said receiver means, and secondly acquisition means (122, 125, C) for acquiring the shadow of said ophthalmic lens illuminated by the lighting means (S);

measurement means (5, 124, C) suitable for measuring the optical deflection power exerted by the ophthalmic lens installed on said receiver means on at least one light ray of said lighting means (S) and for delivering a signal representative of said deflection power; and an electronic and computer system including geometrical correction calculation instructions for deducing from said measured deflection power a corrected shape for at least a portion of the shadow of the ophthalmic lens as perceived by the acquisition means (122, 125, C).

2. A device according to claim 1, in which said corrected shape corresponds substantially to the shape that the shadow of said lens would present if said lens did not possess any deflection power.

3. A device according to claim 1, in which the measurement means (S, 124, C) are suitable for measuring the deflection power exerted by the ophthalmic lens on at least three light rays passing through the lens at three points that are not in alignment.

4. A device according to claim 1, in which the measurement means are of the type proceeding by deflectometry.

5. A device according to claim 4, in which the deflectometry measurement means include at least one beam separator located between the lens receiver means (121, 114) and the acquisition means (122, 125, C).

6. A device according to claim 5, in which the deflectometry measurement means include said acquisition means (122, 125, C).

7. A device according to claim 1, in which the acquisition means include a projection screen (122) and an image acquisition system (C, 125) arranged to sense the image on said projection screen.

8. A device according to claim 1, in which said receiver means, said lighting means, said acquisition means, and said measurement means are held stationary relative to one another.

9. A device according to claim 1, having a single light path between said lighting means and said acquisition means.

10. A device according to claim 5, in which said beam separator is a support (124) for at least one sign (124A, 124B) located between said receiver means and said acquisition means, and in which the geometrical correction relationship calculated by said electronic and computer system is a function of the deformed shadow of the sign (124A, 124B) perceived by the acquisition means (122, 125, C).

11. A device according to claim 10, in which the sign support (124) is activatable and deactivatable.

12. A device according to claim 11, in which said sign support is a transparent active screen suitable for selectively displaying said opaque sign.

13. A device according to claim 12, in which said transparent screen is a liquid crystal screen.

14. A device according to claim 10, in which said sign support has a regular array of repeated patterns.

15. A device according to claim 14, in which said sign support comprises a Hartmann matrix.

16. A device according to claim 10, in which said sign support includes a geometrical figure having a maximum outside dimension lying in the range 2 mm to 10 mm.

17. A device according to claim 16, in which the geometrical covers an area lying in the range 3 mm$^2$ to 80 mm$^2$.

18. A device according to claim 16, in which the geometrical figure is of a shape different from a point or a cross, being suitable for being distinguished visually from a marking made on an ophthalmic lens.

19. A device according to claim 14, in which the geometrical figure is a polygon, preferably a triangle.

20. A device according to claim 14, in which the geometrical figure is a circle or an oval.

21. A device according to claim 1, in which the measurement means are of the type operating by interferometry.

22. A device according to claim 1, including means for placing a handling peg at a location that is determined by calculation on the front face of said ophthalmic lens.

23. A device according to claim 22, in which said means for placing the handling peg are automatic means.

24. A device according to claim 22, in which said means for placing the handling peg are manually controlled manipulator means.

25. A device according to claim 1, including display means controlled by the electronic and computer system to display the at least partially corrected shape of the shadow perceived by the acquisition means (122, 125, C).

26. A device according to claim 25, in which the electronic and computer system controls the display means for displaying the outline of the lens without applying the geometrical correction calculation thereof.

27. A device according to claim 1, in which the electronic and computer system includes image recognition instructions suitable for recognizing the shadow of a mark of the ophthalmic lens as perceived by the acquisition means (122, 125, C) and for applying said geometrical correction calculation thereto so as to deduce therefrom its corrected position in a known frame of reference corresponding substantially to the position that the shadow of said mark would present in said frame of reference in the absence of the lens possessing any deflection power.

28. A device according to claim 27, in which the image recognition instructions are suitable for recognizing the shadow of a center and/or axis mark of the ophthalmic lens as perceived by the acquisition means (122, 125, C).

29. A device according to claim 27, in which the image recognition instructions are suitable for recognizing the shadow of a reference mark for far vision or for near vision on the ophthalmic lens as perceived by the acquisition means (122, 125, C).

30. A method of correcting acquisition of the shadow of an ophthalmic lens (103) presenting one or more marks (PC), the method comprising the following steps:

illuminating the lens by a light beam;

measuring the optical deflection power exerted by the ophthalmic lens on at least one incident light ray of said beam; and from the measured deflection power, deducing by calculation a corrected shape for at least a portion of the shadow of said ophthalmic lens as illuminated by said light beam.

31. A method according to claim 30, in which said corrected shape corresponds substantially to the shape that the shadow of said lens would present if said lens did not possess any deflection power.

32. A method according to claim 30, in which a measurement is made of the deflection power exerted by the ophthalmic lens on at least three distinct light rays passing through the lens at three points that are not in alignment.

33. A method according to claim 30, in which, in order to measure the deflection power of the ophthalmic lens, use is made of deflectometer means.

34. A method according to claim 33, in which, in order to measure the deflection power of the ophthalmic lens, the ophthalmic lens is illuminated and the shadow of the lens is sensed on acquisition means (122, 125, C), a beam separator being disposed between said acquisition means and the lens.

35. A method according to claim 30, in which, in order to measure the deflection power of the ophthalmic lens, use is made of interferometer means.

36. A method according to claim 30, in which, for an ophthalmic lens of the multifocal type, the geometrical correction is applied to at least one reference mark for near vision or for far vision of the multifocal ophthalmic lens in order to obtain a corrected position for said mark.

37. A method according to claim 30, in which the geometrical correction is applied to the shadow of at least one center and/or axis mark of the ophthalmic lens in order to obtain a corrected position for said shadow.

38. A method according to claim 37, in which, a virtual image (200) representative of the outline desired after the lens has been cut to shape is displayed on a display screen (105), and the position of said outline image is identified relative to the corrected position for the shadow of the centering mark on the lens.

39. A method according to claim 30, including a step of displaying the corrected shape of the shadow on the lens on a display screen (105).

40. A method according to claim 39, in which, during said display step, the shadow of the outline of the lens is displayed on a display screen (105) without applying the geometrical correction calculation thereto.

41. A method according to claim 30, including a step of recognizing the shadow of a mark on the ophthalmic lens and a step of applying the geometrical correction calculation to said mark shadow so as to deduce therefrom its corrected position in a known frame of reference, said corrected position corresponding substantially to the position that the shadow of said mark would present in said frame of reference in the absence of the lens having any deflection power.

42. A method according to claim 41, applied to automatically centering the lens, in which the recognized shadow is that of a center and/or axis mark of the ophthalmic lens.

* * * * *